United States Patent [19]

Radun et al.

[11] Patent Number: 5,289,107
[45] Date of Patent: Feb. 22, 1994

[54] SWITCHED RELUCTANCE GENERATOR SYSTEM WITH FAULT RECOVERY CAPABILITY

[75] Inventors: Arthur V. Radun, Ballston Lake; Donald W. Jones, Burnt Hills; Thomas M. Jahns, Schenectady, all of N.Y.

[73] Assignee: General Electric Company, Schenectady, N.Y.

[21] Appl. No.: 968,642

[22] Filed: Oct. 29, 1992

Related U.S. Application Data

[63] Continuation-in-part of Ser. No. 859,754, Mar. 30, 1992, abandoned.

[51] Int. Cl.$^5$ .............................. H02P 8/00; H02P 9/00
[52] U.S. Cl. ...................................... 322/94; 318/696; 318/701; 322/100
[58] Field of Search .................. 318/696, 701; 322/94, 322/100

[56] References Cited

U.S. PATENT DOCUMENTS

| | | | |
|---|---|---|---|
| 4,584,513 | 4/1986 | Freise et al. | 318/701 |
| 4,707,650 | 11/1987 | Bose | 318/685 |
| 4,896,088 | 1/1990 | Jahns | 318/696 |
| 4,896,089 | 1/1990 | Kliman et al, | 318/701 |
| 4,933,621 | 6/1990 | MacMinn et al. | 318/696 |
| 5,012,172 | 4/1991 | Sember | 318/696 |
| 5,012,177 | 4/1991 | Chand et al. | 322/10 |

*Primary Examiner*—R. J. Hickey
*Attorney, Agent, or Firm*—Jill M. Breedlove; Marvin Snyder

[57] ABSTRACT

A switched reluctance generator system, including a converter for coupling a dc voltage via a dc excitation bus (or excitation nodes) to a switched reluctance generator and thereby providing excitation thereto, has a separate generator bus for providing the output voltage of the switched reluctance generator. The generator bus is separate and distinct from the dc excitation bus such that the average current generated by the switched reluctance generator is substantially independent of the generator output voltage. As a result, the switched reluctance generator is capable of resuming generating operation after occurrence of an overload, without requiring a relatively large power source to supply the overload, clear the fault (e.g., via a fuse) and re-excite the generator.

12 Claims, 9 Drawing Sheets

SWITCHED RELUCTANCE GENERATOR SYSTEM WITH FAULT RECOVERY CAPABILITY

This is a continuation in part of Ser. No. 07/859,754, filed Mar. 30, 1992, now abandoned.

FIELD OF THE INVENTION

The present invention relates generally to switched reluctance generator systems and, more particularly, to a switched reluctance generator system capable of clearing a fault and recovering from an overload, and hence resuming generating operation, without requiring a relatively large power source to supply the overload, clear the fault and re-excite the generator.

BACKGROUND OF THE INVENTION

A switched reluctance machine is a brushless, synchronous machine which has an unequal number of salient rotor and stator poles. There is a concentrated winding on each of the stator poles, but no windings or permanent magnets on the rotor. The stator pole windings on opposite stator poles are energized simultaneously. Ideally, the flux entering the rotor from one stator pole balances the flux leaving the rotor from the diametrically opposite stator pole, so that there is no mutual magnetic coupling among the phases.

In operation, there is an electromagnetic force of attraction between the rotor poles and stator poles of a switched reluctance machine. Hence, by properly positioning the stator phase excitation waveforms relative to the rotor angular position, forward or reverse operation and motoring or generating operation can be achieved In particular, if the windings of two diametrically opposite stator poles are excited when a pair of rotor poles are approaching alignment with these excited stator poles, motoring torque is produced; and when the rotor poles are moving out of alignment with the excited stator poles, generating torque is produced.

A switched reluctance generator system is typically a self-excited system that draws its excitation power from the same dc bus into which it generates power. Such a system is electromagnetically limited to a maximum load current that it is capable of delivering without losing its self-excitation. If the maximum load current for the particular switched reluctance generator system is exceeded, e.g., in case of a fault such as a short circuit, then the generated output voltage drops to zero. Unfortunately, since the system is self-excited, once the voltage drops to zero, generating operation cannot be resumed without external intervention; and a relatively large power source is required to supply the overload, clear the fault and re-excite the generator.

Accordingly, it is desirable to provide a switched reluctance generator system capable of clearing a fault and recovering from an overload condition so as to resume generating operation, without requiring a relatively large external power source capable of supplying the full overload to re-excite the generator.

SUMMARY OF THE INVENTION

A switched reluctance generator system, including a converter for coupling a dc voltage via a dc excitation bus to a switched reluctance generator and thereby providing excitation power thereto, has a separate generator bus for providing the output voltage of the switched reluctance generator. The generator bus is separate and distinct from the dc excitation bus such that the average output current generated by the switched reluctance generator is substantially independent of the generator output voltage. As a result, the switched reluctance generator is capable of automatically resuming normal generating operation following occurrence of a short-circuit fault, without requiring a relatively large external power source to supply the high short-circuit current, clear the fault (e.g., via a fuse) and re-excite the generator.

According to an alternative embodiment, the switched reluctance generator is driven by a plurality of converters, each being coupled to an excitation bus and having a separate respective generator bus. The generator busses are coupled by diode-OR means to the excitation bus in order that the generator bus having the highest voltage thereon provides the dc voltage for exciting the excitation bus, thus ensuring that generating operation continues even in the event of an overload on one of the generator busses.

In another alternative embodiment, a switched reluctance generator system includes a plurality of excitation nodes, each excitation node coupling a dc voltage to a respective phase of the converter. A generator bus, separate and distinct from the excitation nodes, provides the output voltage of the switched reluctance generator. As a result of this configuration, the average output current generated by the switched reluctance generator is substantially independent of the generator output voltage, and the switched reluctance generator is capable of resuming generating operation following occurrence of a short-circuit fault, without requiring a relatively large external power source to supply the high short-circuit current, clear the fault (e.g., via a fuse) and re-excite the generator. The same principle of using a plurality of excitation nodes can be similarly employed in a system wherein the switched reluctance generator is driven by a plurality of converters, each phase of each converter being coupled to a separate respective excitation node.

According to yet another alternative embodiment, a converter of the type comprising at least one main switching device coupling the generator output bus with each respective machine phase winding is employed; separate excitation and generator busses are used; and an excitation bus is coupled to each respective converter phase via an additional switching device. During a short-circuit fault, the additional switching devices perform the function of the main switching devices in order to excite their respective machine phases, and generating operation is resumed without requiring a relatively large external power source to supply the high short-circuit current, clear the fault (e.g., via a fuse) and re-excite the generator.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1A:
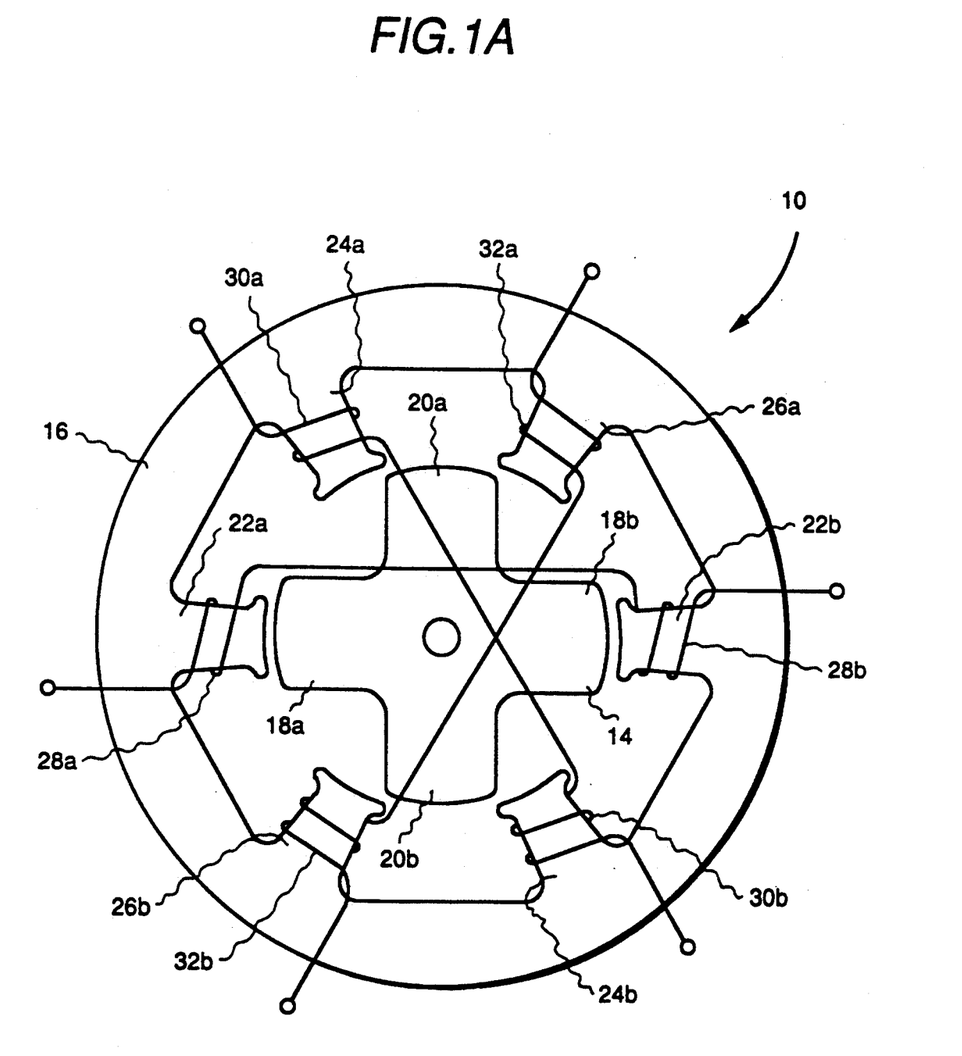
FIG. 1A schematically illustrates a switched reluctance machine.

FIG. 1A shows a typical switched reluctance machine configuration. By way of example, switched reluctance machine 10 is illustrated as a three-phase machine, including a rotor 14 rotatable in either a forward or reverse direction within a stationary stator 16. Rotor 14 has two pairs of diametrically opposite rotor poles 18a-18b and 20a-20b. Stator 16 has three pairs of diametrically opposite stator poles 22a-22b, 24a-24b and 26a-26b. Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series or in parallel to form a machine phase winding.

Figure 1B:
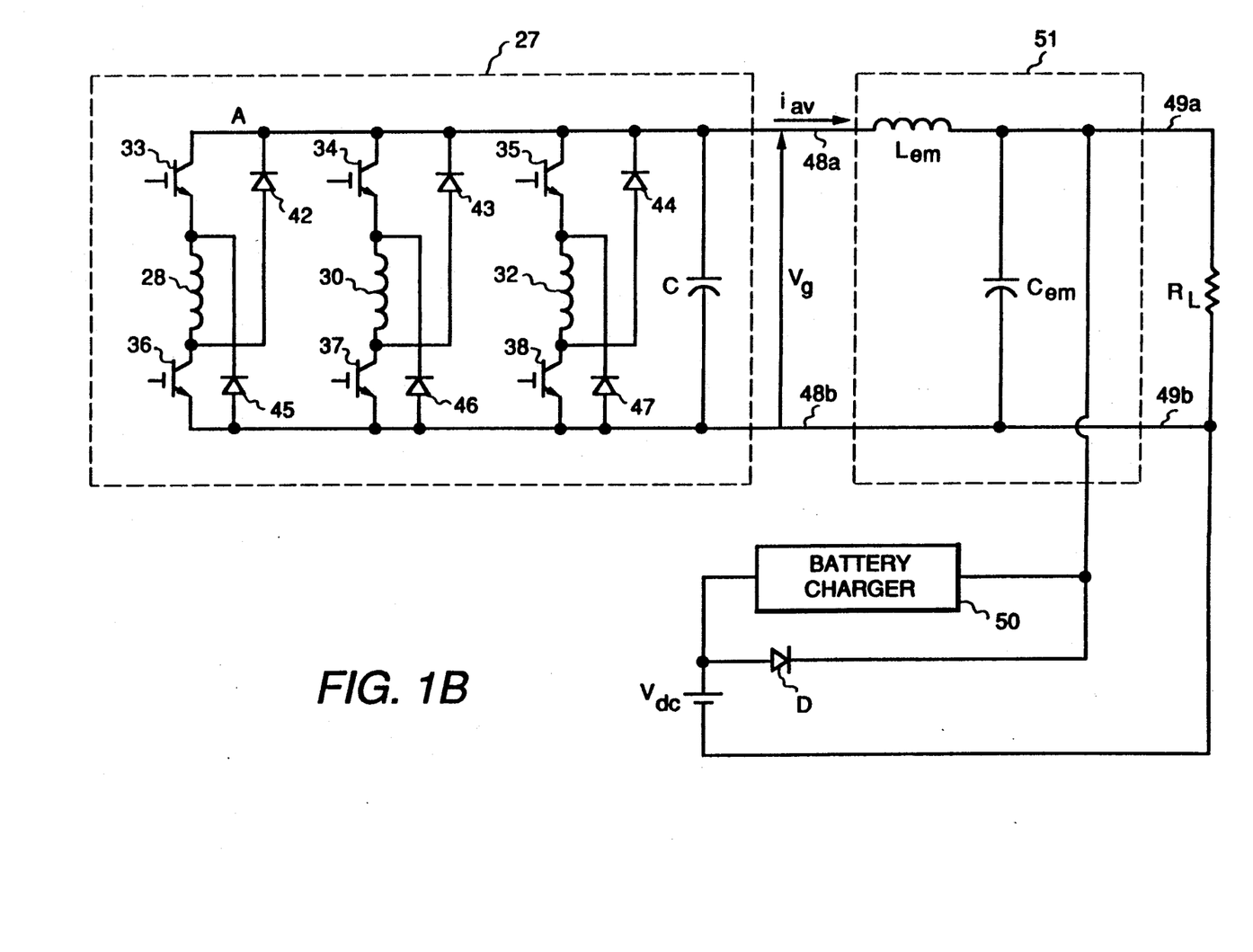
FIG. 1B schematically illustrates a typical switched reluctance generator system.

FIG. 1B illustrates a typical switched reluctance generator system including a converter 27. As illustrated in FIG. 1B, the stator pole windings comprising each companion pair 28, 30 and 32, respectively, are connected in series with each other and with an upper current switching device 33, 34 and 35, respectively, and with a lower current switching device 36, 37 and 38, respectively. The upper and lower switching devices each comprise an insulated gate bipolar transistor (IGBT), but other suitable current switching devices may be used; for example, field effect transistors (FET's), gate turn-off thyristors (GTO's), MOS-controlled thyristors (MCT's) or bipolar junction transistors (BJT's). Each phase winding is further coupled to generator output bus terminals 48a and 48b by flyback or return diodes 42 and 45, 43 and 46, and 44 and 47, respectively. Each series combination of a phase winding with two corresponding switching devices and two flyback diodes comprises one phase leg of converter 27. The converter phase legs are connected in parallel with each other and are connected to the generator output bus terminals 48a and 48b. Capacitance C is also connected to the generator output bus in order to absorb ripple current produced by the machine phases, thereby filtering the dc voltage $V_g$ developed across the generator output bus terminals. The generator system of FIG. 1B is also shown as including an electromagnetic interference filter 51 of a well-known type comprising a capacitance $C_{em}$ and an inductance $L_{em}$. Resistance $R_L$ coupled in parallel with Capacitance $C_{em}$ represents the generator load. FIG. 1B also includes a dc source $V_{dc}$, such as a battery or rectified ac source, which is connected to the load output terminals 49a and 49b via the parallel combination of a diode D and a battery charger 50.

In order to establish excitation in the switched reluctance generator during initial start-up, dc voltage is applied to the load bus terminals 49a and 49b by source $V_{dc}$ via the forward-biased diode D. Thereafter, during normal generating operation, the generator bus voltage $V_g$ is greater than the source voltage $V_{dc}$ so that diode D is reverse-biased, and the dc generator bus voltage $V_g$ self-excites the generator machine windings. Disadvantageously, however, if an excessive overload condition, such as a short circuit, occurs, then the generator output voltage $V_g$ falls to zero, resulting in loss of the machine's self-excitation. Diode D becomes forward-biased under these conditions such that the dc source must be large enough to supply the full short-circuit current until the fault is cleared by blowing a fuse or opening a circuit breaker. Restoration of normal generating operation following the fault requires that the dc source have sufficient reserve capacity to apply recovery voltage $V_{dc}$ to the generator bus terminals 48a and 48b via diode D and inductor $L_{em}$ in order to re-excite the generator.

Figure 2:
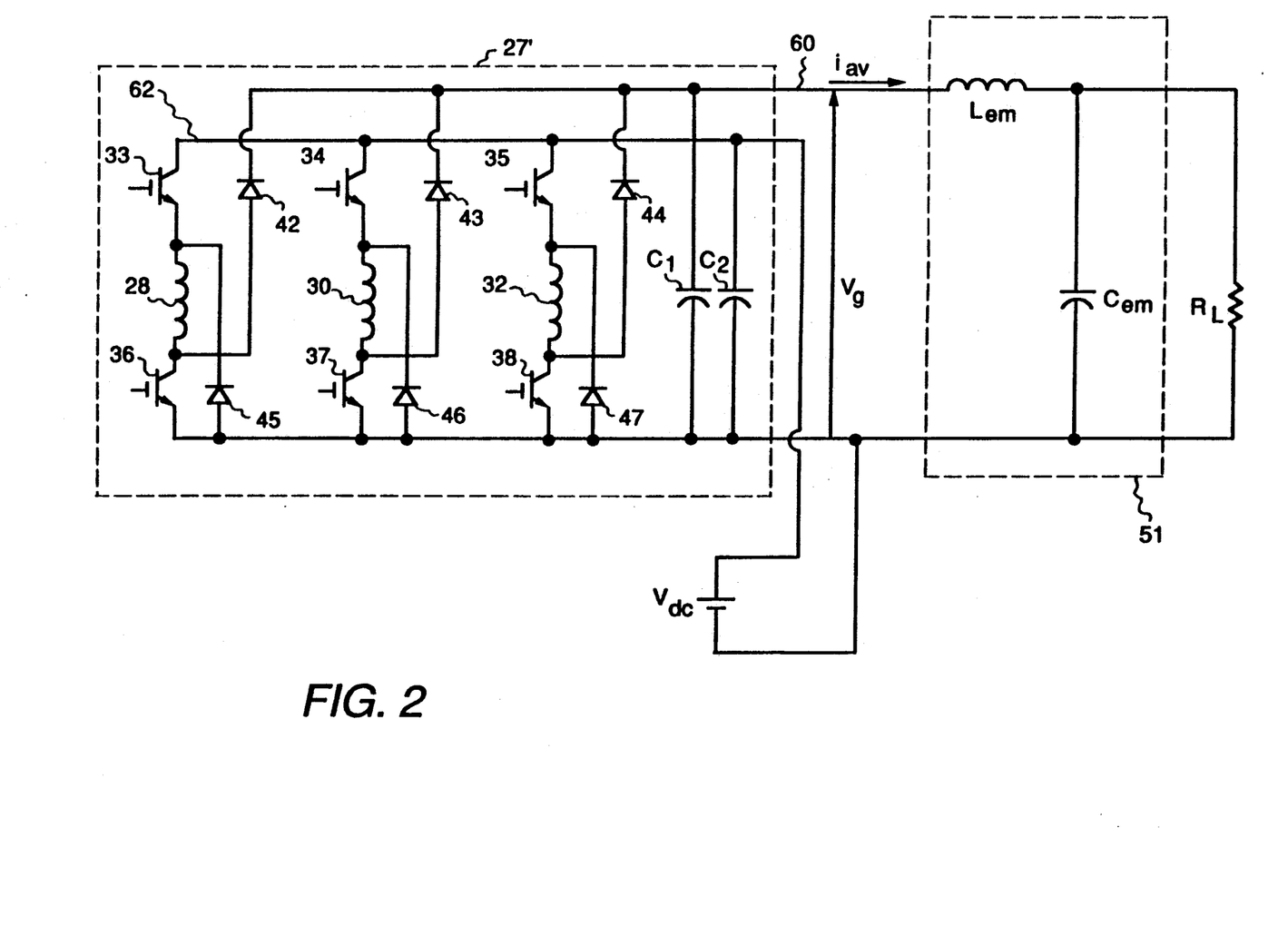
FIG. 2 schematically illustrates a switched reluctance generator system according to the present invention.

FIG. 2 illustrates a switched reluctance generator system according to the present invention having a generator bus 60 for providing the generator output voltage that is separate and distinct from an excitation bus 62. As shown, excitation bus 62 is directly coupled to the dc source $V_{dc}$ and to the upper switching devices 33-35 of converter 27', and generator bus 60 is coupled to the cathodes of upper flyback diodes 42-44. Separate filter capacitances $C_1$ and $C_2$ are provided for the separate busses 60 and 62, respectively. As a result of the switched reluctance generator configuration of the present invention, the average generator output current $i_{av}$ depends only on the availability of excitation voltage $V_{dc}$ and can be controlled to be independent of the generated voltage $V_g$. Hence, in the event of an excessive overload or short-circuit load fault, generating action is maintained by the switched reluctance generator. Advantageously, the source $V_{dc}$ is only required to provide the machine excitation power during all normal generating operation as well as operation under fault conditions, which is only a fraction of the output power delivered to the load.

Figure 3:
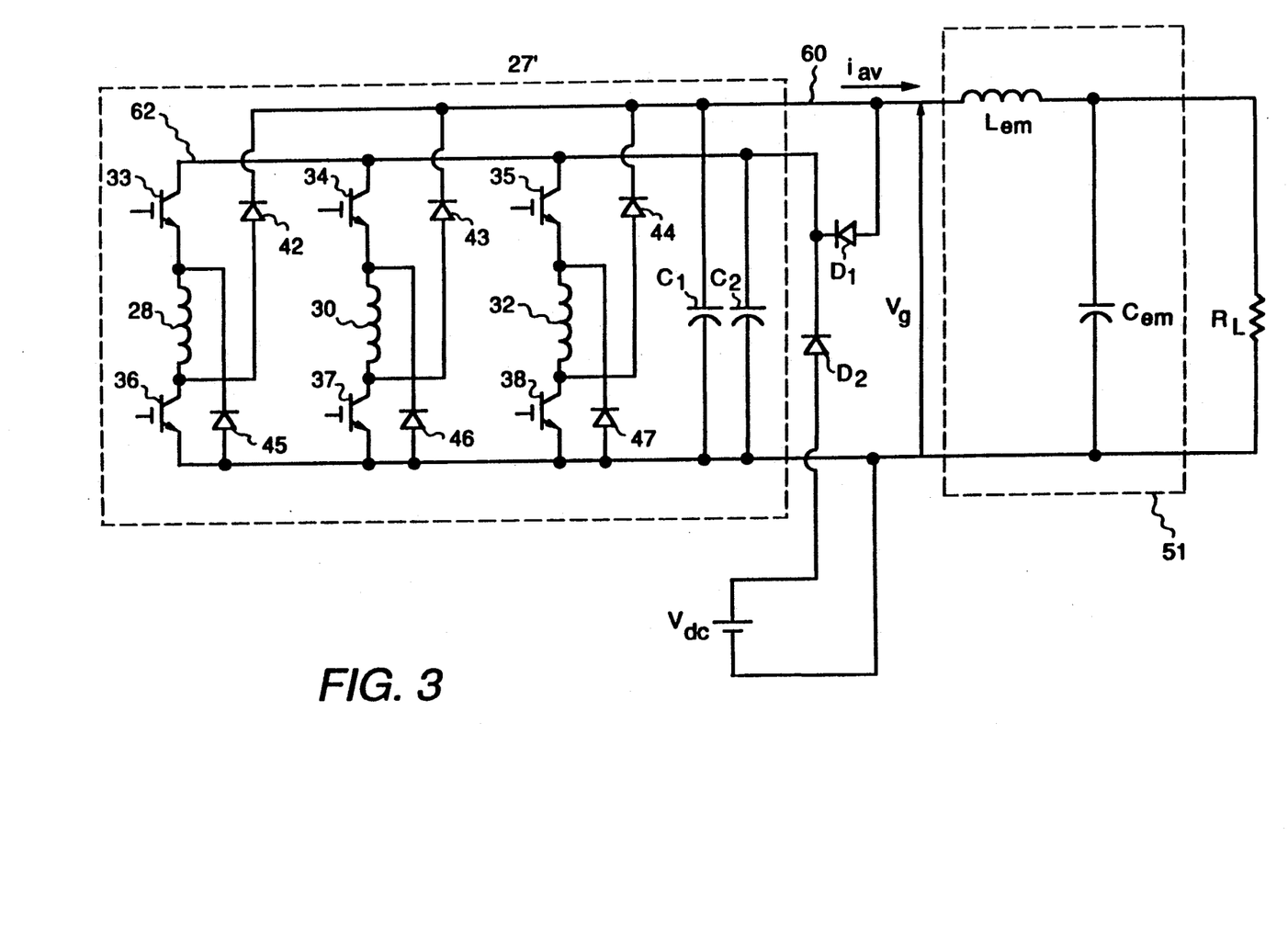
FIG. 3 schematically illustrates an alternative embodiment of switched reluctance generator system of the present invention.

FIG. 3 illustrates an alternative embodiment of the switched reluctance generator system of FIG. 2. Specifically, the cathode of a diode $D_1$ is connected to generator bus 60, and the anode of diode $D_1$ is connected to excitation bus 62. In addition, the cathode of another diode $D_2$ is connected to excitation bus 62, and the anode of diode $D_2$ is connected to the dc source $V_{dc}$. During normal generating operation, generator bus voltage $V_g$ is greater than source voltage $V_{dc}$ such that diode $D_1$ is forward-biased, and diode $D_2$ is reverse-biased such that the generated output voltage $V_g$ provides power to the excitation bus to maintain generating operation. In case of an excessive overload or short-circuit fault, however, diode $D_1$ becomes reverse-biased when $V_g$ drops below $V_{dc}$, and diode $D_2$ is forward-biased such that the dc source $V_{dc}$ provides power to the excitation bus in order to maintain generating action. Hence, the source $V_{dc}$ is only required to provide excitation power during a fault, rather than full output power delivered to the fault. Moreover, during normal operation, the source $V_{dc}$ is not required to supply any power.

Figure 4A:
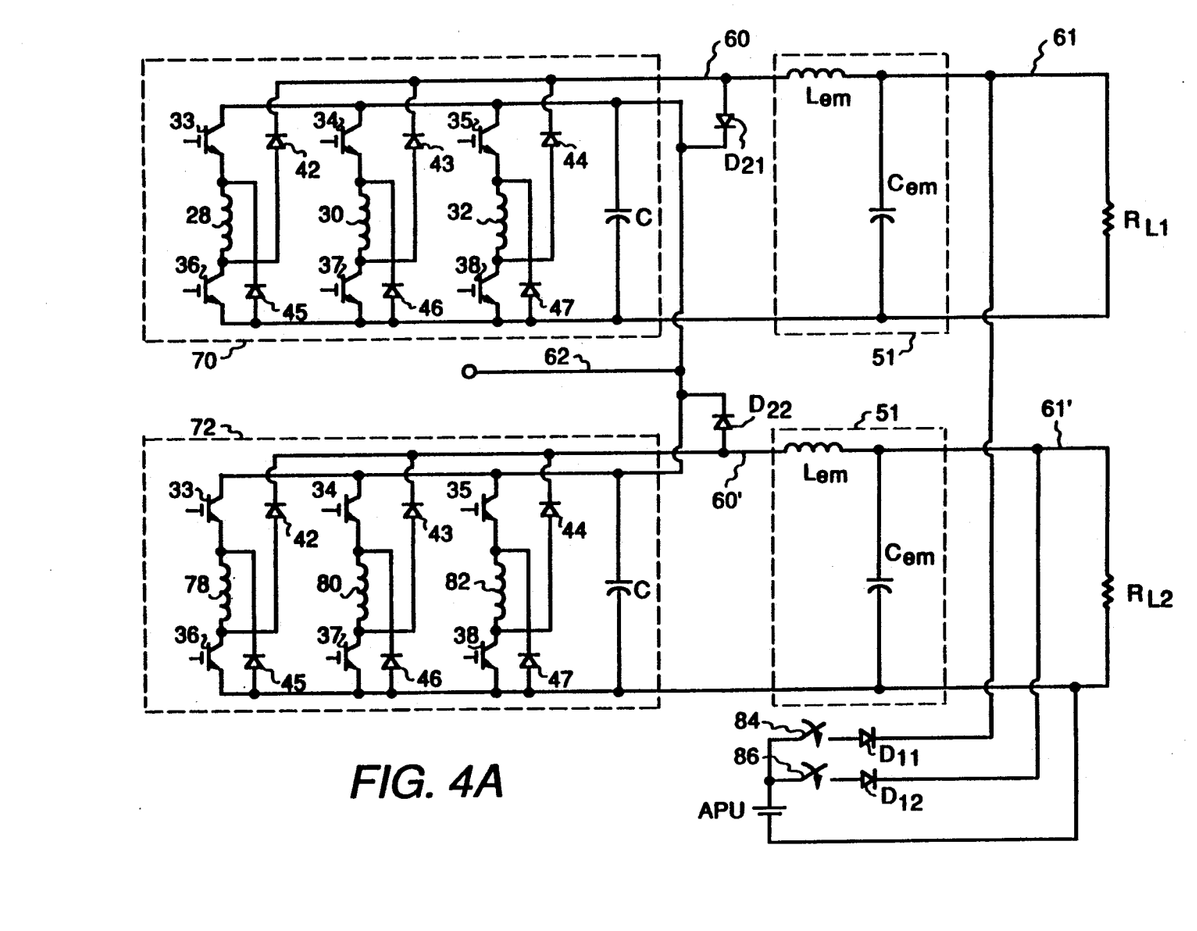
FIG. 4A schematically illustrates another alternative embodiment of a switched reluctance generator system of the present invention.

FIG. 4A illustrates an alternative embodiment of a switched reluctance generator system of the present invention wherein a plurality of converters are employed to excite the generator. By way of example, two three-phase converters 70 and 72 are shown for driving six phase windings 28, 30, 32, 78, 80 and 82 of a six-phase switched reluctance generator. The system of FIG. 4A includes diode-OR means comprising a first diode, $D_{11}$ and $D_{12}$, respectively, coupled, via a switch, 84 and 86, respectively, between an auxiliary power unit APU source and each respective output load bus 61 and 61', and further comprising a second diode $D_{21}$ and $D_{22}$, respectively, coupled between each respective generator bus, 60 and 60', respectively, and the excitation bus 62. Initially, to start the generator, switches 84 and 86 are closed, and power is provided by the APU source to the excitation bus 62 via diodes $D_{11}$, $D_{12}$, $D_{21}$ and $D_{22}$ in order to excite the generator. Thereafter, during normal generating operation, switches 84 and 86 are open, and the APU source is shut down; and generating operation is maintained with the generator busses 60 and 60' supplying power to the excitation bus 62. In case of an excessive overload or short-circuit fault on either generator bus 60 or 60', but not both, the diode-OR means ensures that the other generator bus provides excitation in order to maintain generating operation on both generator busses.

Figure 4B:
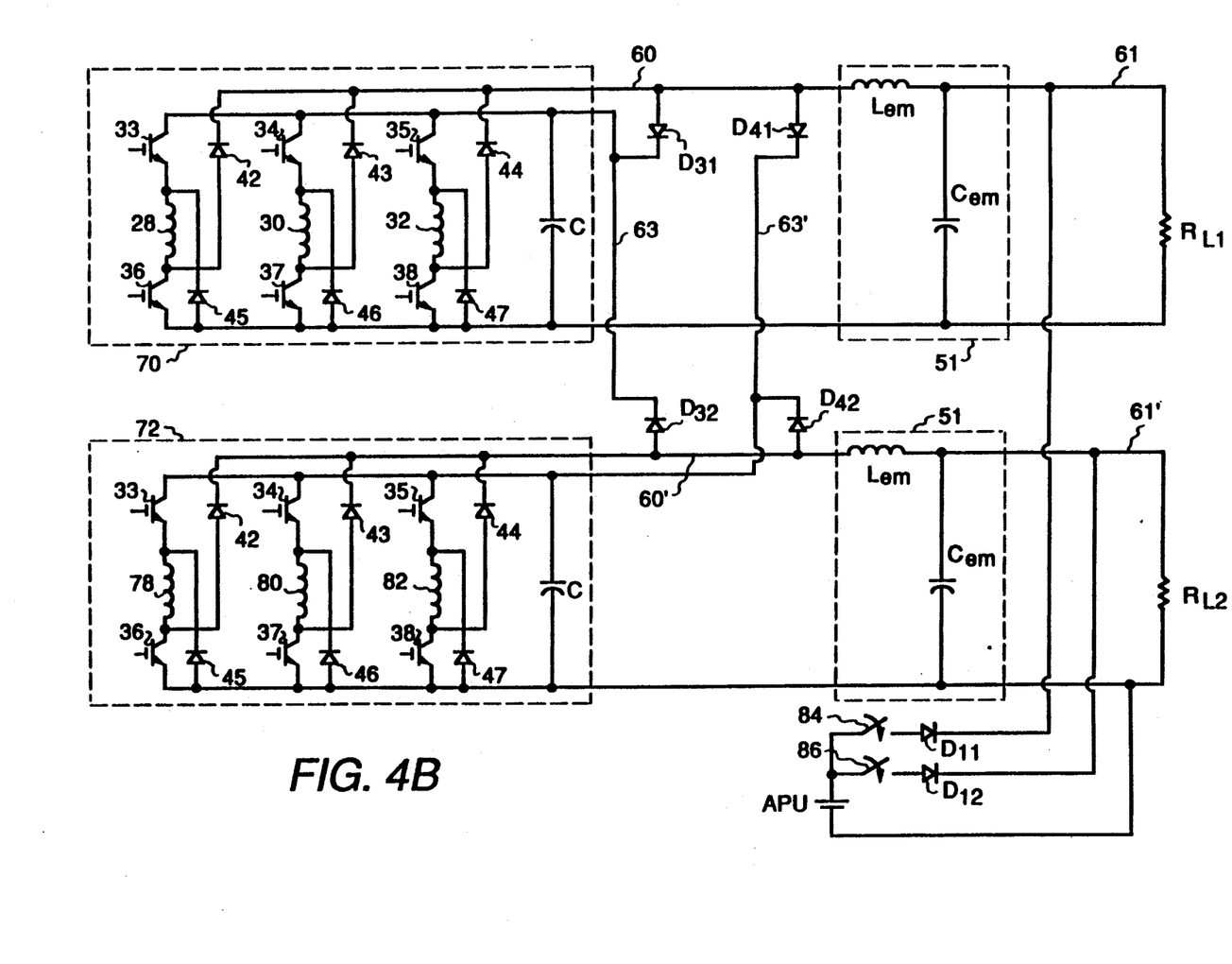
FIG. 4B schematically illustrates another alternative embodiment of a switched reluctance generator system of the present invention.

In FIG. 4B, an alternative version of the FIG. 4A embodiment is illustrated wherein each of the plurality of converters is provided with its own distinct excitation bus. For example, as shown in FIG. 4B, each of the two three-phase converters 70 and 72 has an associated excitation bus 63 and 63', respectively. The system of FIG. 4B further includes diode-OR means for coupling each of the two excitation busses 63 and 63' to the two generator busses 60 and 60', respectively. Diodes $D_{31}$ and $D_{32}$ provide this OR coupling function for excitation bus 63; and diodes $D_{41}$ and $D_{42}$ provide this OR coupling function for excitation bus 63'. In operation, this alternative embodiment behaves in much the same way as the embodiment in FIG. 4A. That is, the generator bus having the higher voltage supplies current to both of the excitation busses 63 and 63' in case the voltage on the other generator bus is reduced due to heavy overload conditions or a short-circuit fault. This embodiment extends naturally to configurations with more than two converters, providing the system designer with flexibility regarding how many and which generator busses the designer wishes to couple to each respective excitation bus using the diode-OR configuration.

Figure 5:
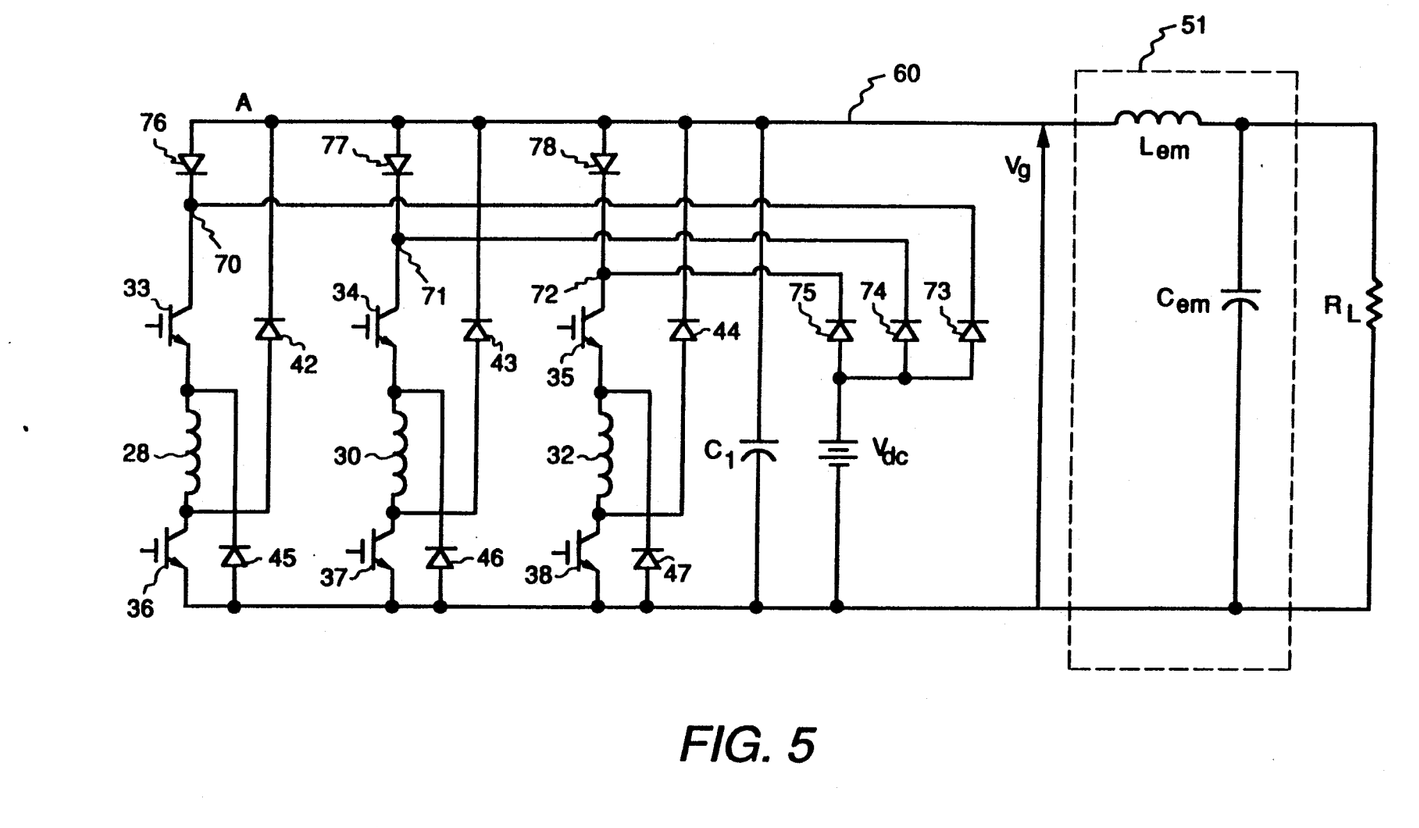
FIG. 5 schematically illustrates another alternative embodiment of a switched reluctance generator system of the present invention.

FIG. 5 illustrates another alternative embodiment of a switched reluctance generator system including an excitation node 70-72 for coupling each respective phase leg of the converter thereto. In particular, the dc source $V_{dc}$ is coupled via diodes 73-75, respectively, to excitation nodes 70-72, respectively. The generator bus 60 is likewise coupled to excitation nodes 70-72 via diodes 76-78, respectively. During normal generating operation, generator bus voltage $V_g$ is greater than source voltage $V_{dc}$ so that diodes 76-78 are forward-biased and diodes 73-75 are reverse-biased such that excitation is provided by the generator bus 60. However, during start-up and overload or short-circuit fault conditions, diodes 73-75 are forward-biased and diodes 76-78 are reverse-biased whenever $V_g$ drops below $V_{dc}$ such that excitation is provided by the dc source $V_{dc}$.

Figure 6:
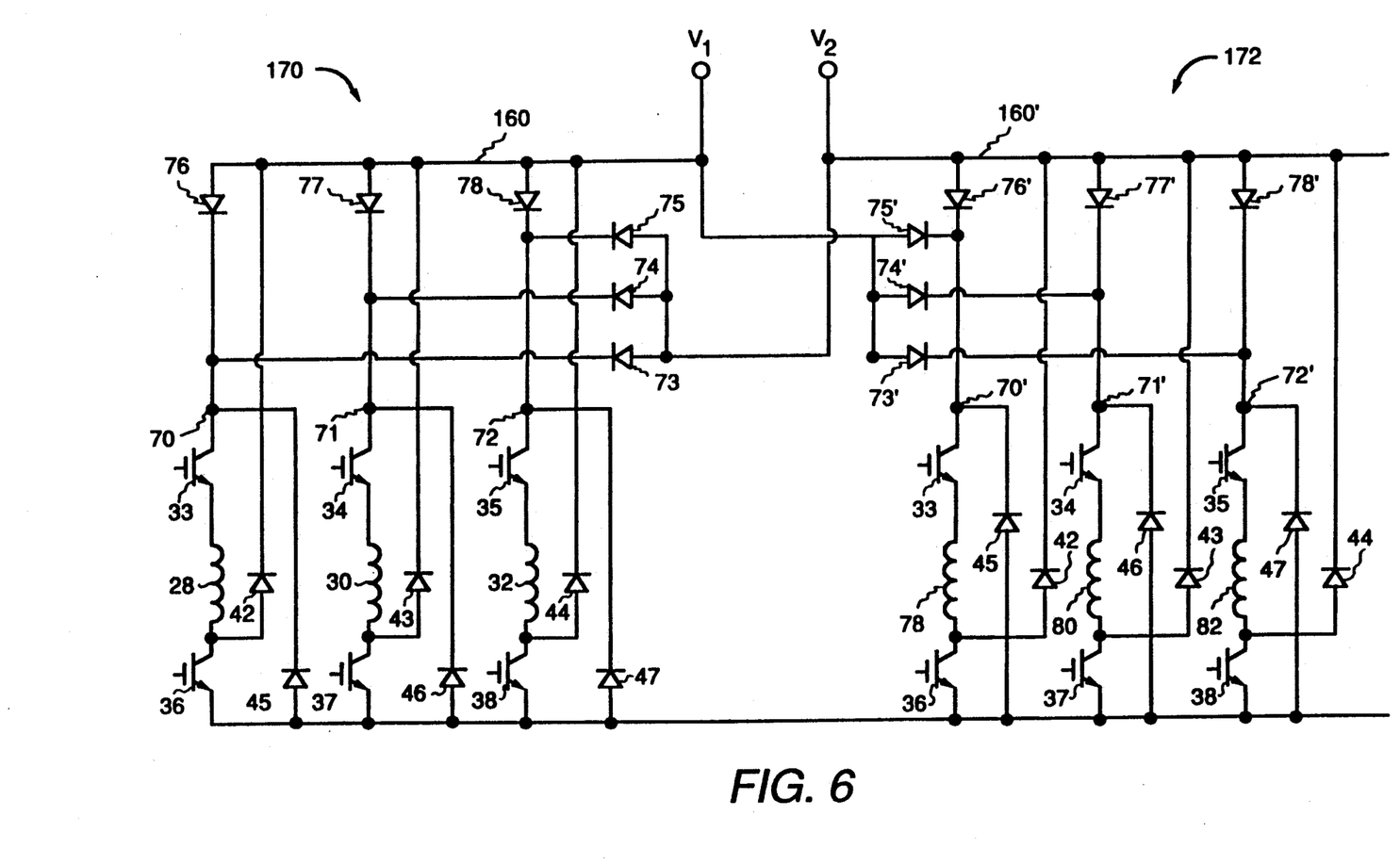
FIG. 6 schematically illustrates still another alternative embodiment of a switched reluctance generator system of the present invention.

In FIG. 6, the same principle of using a plurality of excitation nodes is similarly applied to a system wherein the switched reluctance generator is driven by a plurality of converters, each phase leg of each converter being coupled to a separate respective excitation node. By way of example, two three-phase converters 170 and 172 are shown for driving six phase windings 28, 30, 32, 78, 80 and 82 of a six-phase switched reluctance generator. The generated output voltage $V_2$ of converter 172 is coupled via diodes 73-75 to excitation nodes 70-72, respectively, of converter 170. Likewise, the generated output voltage $V_1$ of converter 170 is coupled via diodes 73'-75' to excitation nodes 70'-72', respectively, of converter 172. Hence, the two converter of FIG. 6 are cross-coupled (in similar manner as that of FIG. 4B) such that if there is a fault on either generator bus 160 or 160', the other generator bus provides excitation in order to maintain generating operation on both generator busses. The EMI filters and loads attached to the two generator busses 160 and 160' have been deleted from FIG. 6 for simplicity.

Figure 7:
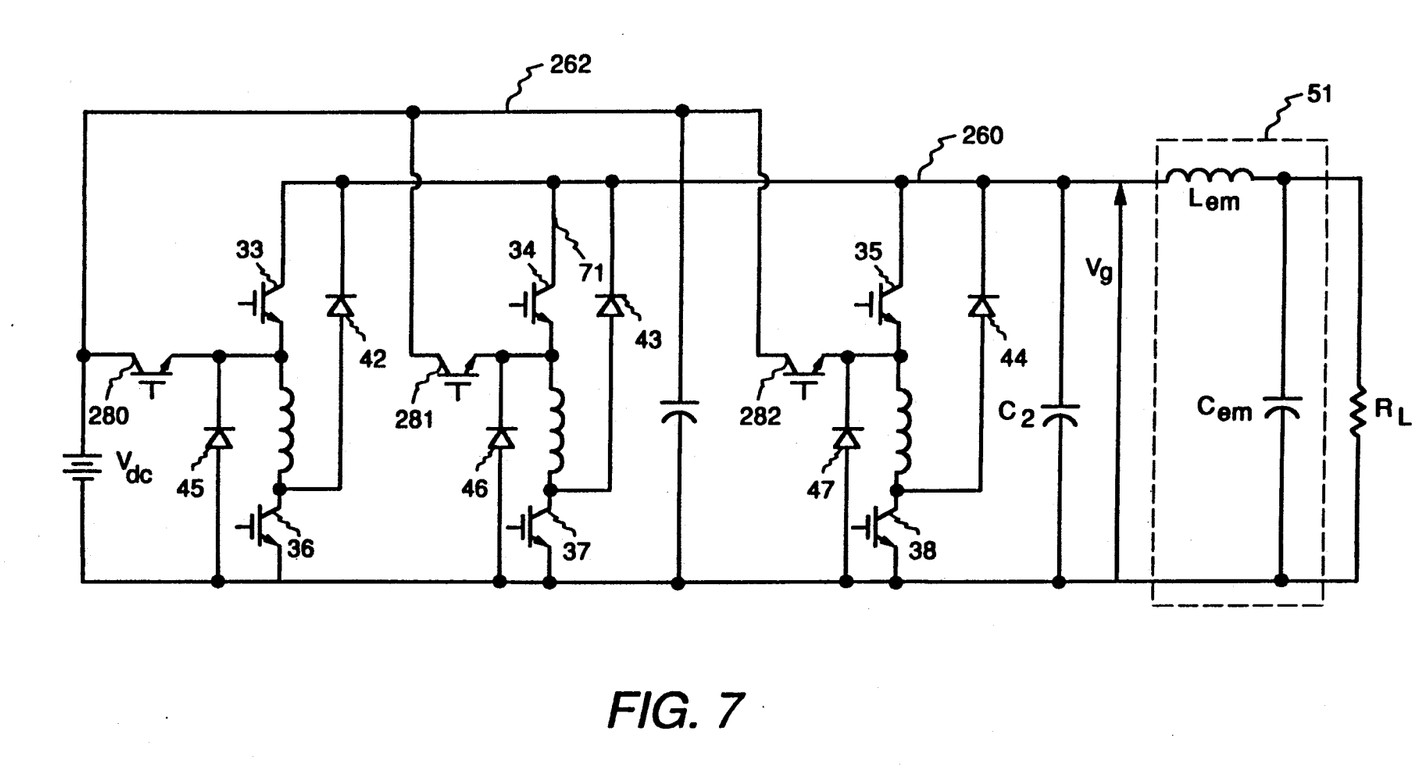
FIG. 7 schematically illustrates yet another alternative embodiment of a switched reluctance generator system of the present invention.

In yet another alternative embodiment, as illustrated in FIG. 7, separate excitation and generator busses, 260 and 262, respectively, are used; and the excitation bus is coupled to each respective phase leg via an additional switching device 280-282, respectively. It is assumed in this embodiment that the switching devices 33-35 and 280-282 are all capable of blocking reverse voltage applied across their terminals (i.e., from emitter to collector in FIG. 7). During a heavy overload or short-circuit fault, the additional switching devices 280-282 perform the function of the main switching devices 33-35, respectively, while these main switches 33-35 are gated off so that they behave as open circuits. Thus, generating operation is maintained by drawing excitation power from dc source $V_{dc}$ without requiring a relatively large power source to supply the overload/fault current, clear the fault (e.g., via a fuse) and re-excite the generator. During normal generating operation, switching devices 280-282 are gated off so that no power is drawn from the Vdc source.

Advantageously, a switched reluctance generator system according to the present invention requires only an excitation source for supplying a fraction (e.g., 10-30%) of the corresponding generator output power for exciting the generator. Hence, a large external power source capable of supplying the full short-circuit fault current, clearing the fault (e.g., via a fuse) and re-exciting the generator is thus not required.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A switched reluctance generator system, comprising:
   a switched reluctance generator including a stator having at least one pair of opposing stator poles with a machine phase winding wound thereon and further including a rotor having at least one pair of opposing rotor poles;
   a converter for coupling a dc voltage from a dc power source via a dc excitation bus to said switched reluctance generator and thereby providing power to excite said generator; and
   a generator bus for providing the output voltage of said switched reluctance generator, said generator bus being separate and distinct from said dc excitation bus such that the average current generated by said switched reluctance generator is substantially independent of said output voltage.

2. The switched reluctance generator system of claim 1, further comprising:

OR means for coupling said output voltage to said excitation bus during normal generating operation and for coupling said dc power source to said excitation bus during starting and during operation under heavy overload and short-circuit fault conditions.

3. The switched reluctance generator system of claim 1 wherein said converter comprises at least one switching device connected in series with each respective machine phase winding, each said switching device being coupled to said excitation bus for excitation thereby, said converter further comprising flyback diodes means coupled to said generator bus for delivering electromagnetic energy stored in the respective machine phase winding thereto at the end of the conduction interval of the respective switched reluctance generator phase.

4. A switched reluctance generator system, comprising:

a multi-phase switched reluctance generator including a stator having at least one pair of opposing stator poles corresponding to each respective generator phase with a machine phase winding wound thereon and further including a rotor having at least one pair of opposing rotor poles;

a plurality of converters, each respective converter coupling a dc voltage via an excitation bus to said switched reluctance generator and thereby providing power to excite said generator; and a generator bus associated with each respective converter for providing the output voltage of said switched reluctance generator, each said generator bus being separate and distinct from said excitation bus such that the average current generated by said switched reluctance generator is substantially independent of said output voltage;

OR means for coupling each respective generator bus to said excitation bus such that the generator bus having the highest voltage thereon delivers power to said excitation bus.

5. The switched reluctance generator system of claim 4 wherein each said converter comprises at least one switching device connected in series with each respective machine phase winding, each said switching device being coupled to said excitation bus for excitation thereby, each said converter further comprising flyback diodes means coupled to said generator bus for delivering electromagnetic energy stored in the respective machine phase winding thereto at the end of the conduction interval of the respective switched reluctance generator phase.

6. A switched reluctance generator system, comprising:

a multi-phase switched reluctance generator including a stator having at least one pair of opposing stator poles corresponding to each respective generator phase with a machine phase winding wound thereon and further including a rotor having at least one pair of opposing rotor poles;

a plurality of converters, each respective converter having an associated excitation bus for coupling a dc voltage to said switched reluctance generator and thereby providing power to excite said generator;

a generator bus associated with each respective converter for providing the output voltage of said switched reluctance generator, each said generator bus being separate and distinct from the excitation bus associated with its respective converter such that the average current generated by said switched reluctance generator is substantially independent of said output voltage; and OR means for coupling each said excitation bus to at least two of the respective generator busses such that the coupled generator bus having the highest voltage thereon delivers power to each respective excitation bus.

7. The switched reluctance generator system of claim 6 wherein each said converter comprises at least one switching device connected in series with each respective machine phase winding, each said switching device being coupled to said excitation bus for excitation thereby, each said converter further comprising flyback diodes means coupled to said generator bus for delivering electromagnetic energy stored in the respective machine phase winding thereto at the end of the conduction interval of the respective switched reluctance generator phase.

8. A switched reluctance generator system, comprising:

a multi-phase switched reluctance generator including a stator having at least one pair of opposing stator poles corresponding to each respective generator phase with a machine phase winding wound thereon and further including a rotor having at least one pair of opposing rotor poles;

a converter for coupling a dc voltage from a dc power source to said switched reluctance generator and thereby providing power to excite said generator, said converter including a plurality of excitation nodes, each said excitation node coupling, via first diode means, one phase of said converter to said dc power source during starting and during operation under heavy overload and short-circuit fault conditions; and a generator bus for providing the output voltage of said switched reluctance generator, said generator bus being separate and distinct from said excitation nodes such that the average current generated by the switched reluctance generator is substantially independent of said output voltage; and second diode means coupling the output voltage on said generator bus to the excitation node associated with each respective phase of said converter during normal generating operation.

9. The switched reluctance generator system of claim 8 wherein said converter comprises at least one switching device connected in series with each respective machine phase winding, said converter further comprising flyback diodes means coupled to said generator bus for delivering electromagnetic energy stored in the respective machine phase winding thereto at the end of the conduction interval of the respective switched reluctance generator phase.

10. A switched reluctance generator system, comprising:

a multi-phase switched reluctance generator including a stator having at least one pair of opposing stator poles corresponding to each respective generator phase with a machine phase winding wound thereon and further including a rotor having at least one pair of opposing rotor poles;

a plurality of converters, each said converter including a plurality of excitation nodes, each said excitation node providing power to excite one phase of said generator;

a generator bus associated with each respective converter for providing the output voltage of said switched reluctance generator, each said generator bus being separate and distinct from said excitation nodes such that the average current delivered by each generator bus is substantially independent of its associated output voltage;

OR means for coupling each said excitation node to the generator bus associated with its respective converter and to at least one of the other generator busses associated with the other converters such that the coupled generator bus having the highest voltage thereon delivers power to said excitation node and its associated generator phase.

11. The switched reluctance generator system of claim 10 wherein each said converter comprises at least one switching device connected in series with each respective machine phase winding, each said converter further comprising flyback diodes means coupled to said generator bus for delivering electromagnetic energy stored in the respective machine phase winding thereto at the end of the conduction interval of the respective switched reluctance generator phase.

12. A switched reluctance generator system, comprising:

a switched reluctance generator including a stator having at least one pair of opposing stator poles with a machine phase winding wound thereon and further including a rotor having at least one pair of opposing rotor poles;

a converter incorporating switching means for coupling a dc voltage from a dc power source via a dc excitation bus to each phase of said switched reluctance generator, said switching means being activated during starting and during operation under heavy overload and short-circuit fault conditions to provide power to excite said generator, said switching means being deactivated during normal generating operation;

a generator bus for providing the output voltage of said switched reluctance generator, said generator bus being separate and distinct from said dc excitation bus such that the average current generated by said switched reluctance generator can be controlled to be substantially independent of said output voltage;

said converter further comprising converter switching means for coupling said generator bus to each respective machine phase winding, said converter switching means being controlled to provide excitation power to said generator during normal generating operation, said converter switching means being deactivated during starting and during heavy overload and short-circuit fault conditions; and said converter further comprising flyback diodes means coupled to said generator bus for delivering electromagnetic energy stored in the respective machine phase winding thereto at the end of the conduction interval of the respective switched reluctance generator phase.

* * * * *